United States Patent
Liu (10) Patent No.: US 11,419,055 B2
(45) Date of Patent: Aug. 16, 2022

(54) OCCUPATION CONTROL METHOD FOR CAMERA APPLICATION BASED ON OPERATING STATE OF DEVICE AND CAMERA DATA REQUESTS

(71) Applicant: GUANGDONG OPPO MOBILE TELECOMMUNICATIONS CORP., LTD., Guangdong (CN)

(72) Inventor: Li Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 10 days.

(21) Appl. No.: 17/161,174

(22) Filed: Jan. 28, 2021

(65) Prior Publication Data

US 2021/0153130 A1 May 20, 2021

Related U.S. Application Data

(63) Continuation of application No. PCT/CN2019/091808, filed on Jun. 19, 2019.

(30) Foreign Application Priority Data

Aug. 22, 2018 (CN) .......................... 201810962589.1

(51) Int. Cl.
*H04W 52/02* (2009.01)
(52) U.S. Cl.
CPC .............................. *H04W 52/0264* (2013.01)
(58) Field of Classification Search
CPC .............. H04W 52/0264; G06F 9/485; H04M 1/72454; H04M 2250/52; Y02D 10/00; Y02D 30/70
See application file for complete search history.

(56) References Cited

U.S. PATENT DOCUMENTS 6,002,436 A 12/1999 Anderson
11,132,219 B2 * 9/2021 Chen .................... G06F 12/023
(Continued)

FOREIGN PATENT DOCUMENTS

CN 101179654 A 5/2008
CN 103257939 A 8/2013
(Continued)

OTHER PUBLICATIONS

International Search Report with English Translation for International application No. PCT/CN2019/091808, dated Sep. 11, 2019 (11 pages).
(Continued)

*Primary Examiner* — Philip Sobutka
(74) *Attorney, Agent, or Firm* — Young Basile Hanlon & MacFarlane, P.C.

(57) ABSTRACT

The present disclosure provides an occupation control method for a camera application including: when a camera application is occupied by a first application running in the foreground, if it is determined that a terminal device is in a preset first operation state, detecting whether the first application sends a camera data request message; if so, sending to the camera application a message for delaying shutdown for a first duration and detecting whether the state of the terminal device is switched from the first operation state to a second operation state within the first duration; if the state is not switched to the second operation state and it is detected the first application continues to send the camera data request message, detecting whether the first application enables a function related to the camera data request, and if not, controlling the first application to release the occupation of the camera application.

20 Claims, 4 Drawing Sheets

(56) References Cited

U.S. PATENT DOCUMENTS

| | | | |
|---|---|---|---|
| 2014/0280896 A1 | 9/2014 | Papakostas et al. | |
| 2017/0090683 A1* | 3/2017 | Liu | G06F 9/44 |
| 2017/0142333 A1 | 5/2017 | Huang | |
| 2019/0364221 A1* | 11/2019 | Jin | H04N 5/22521 |

FOREIGN PATENT DOCUMENTS

| | | | |
|---|---|---|---|
| CN | 104038698 A | 9/2014 | |
| CN | 105282832 A | 1/2016 | |
| CN | 106060275 A | 10/2016 | |
| CN | 106371737 A | 2/2017 | |
| CN | 107329559 A | 11/2017 | |
| CN | 107704152 A | 2/2018 | |
| CN | 107707768 A | 2/2018 | |
| CN | 107765834 A | 3/2018 | |
| CN | 107797645 A | 3/2018 | |
| CN | 107861603 A | 3/2018 | |
| CN | 107967178 A | 4/2018 | |
| CN | 108052196 A | 5/2018 | |
| CN | 109144728 A | 1/2019 | |
| JP | 2000165419 A | 6/2000 | |

OTHER PUBLICATIONS

First Office Action from China patent office with English Translation for in a counterpart Chinese patent Application 201810962589.1, dated Apr. 9, 2020 (18 pages).

Second Office Action from China patent office with English Translation for in a counterpart Chinese patent Application 201810962589.1, dated Jul. 3, 2020 (10 pages).

Extended European Search Report for EP Application 19852477.9 dated Aug. 19, 2021. (9 pages).

\* cited by examiner

OCCUPATION CONTROL METHOD FOR CAMERA APPLICATION BASED ON OPERATING STATE OF DEVICE AND CAMERA DATA REQUESTS

CROSS-REFERENCE TO RELATED APPLICATION(S)

The present disclosure is an application of International (PCT) Patent Application No. PCT/CN2019/091808 filed on Jun. 19, 2019, which claims priority of Chinese Patent Application No. 201,810,962,589.1, filed on Aug. 22, 2018, the entire disclosures of both of which are herein incorporated by reference.

TECHNICAL FIELD

The present disclosure relates to the technical field of terminal device control, and particularly to an occupation control method for a camera application, a terminal device, and a storage medium.

BACKGROUND

With popularization of terminal devices, such as smart phones, types and functions of applications in the terminal devices have become more diversified. Moreover, functions that rely on camera applications have also been developed, such as live broadcast functions and video chat functions that rely on the camera applications.

SUMMARY

A first object of the present disclosure is to provide an occupation control method for a camera application, comprising: detecting whether a first application sends a camera data request message in response to that the camera application is occupied by the first application running in the foreground and determining that a terminal device is in a preset first operating state; sending a delay shutdown message of delaying a first duration to the camera application in response to detecting that the first application sends the camera data request message, and detecting whether a state of the terminal device is switched from the first operating state to a second operating state within the first duration; detecting whether the first application turns on functions related to the camera data request in response to the state of the terminal device not switched to the second operating state and detecting that the first application continues to send the camera data request message, and controlling the first application to release occupancy of the camera application in response to the functions not turned on.

An embodiment according to a second aspect of the present disclosure provides a terminal device, comprising: a memory, a processor, and a computer program stored on the memory and operable on the processor, where the computer program, in response to being executed by the processor, implements operations of an occupation control method for a camera application according to the first aspect.

An embodiment according to a third aspect of the present disclosure provides a non-transitory computer-readable storage medium, having stored on a computer program which, in response to being executed by the processor, implements operations of an occupation control method for a camera application according to the first aspect.

BRIEF DESCRIPTION OF DRAWINGS

In order to describe technical solutions in embodiments of the present disclosure more clearly, drawings required being used in description of the embodiments will be simply introduced below. Obviously, the drawings in the following description are merely some embodiments of the present disclosure. For one of ordinary skill in the art, it is also possible to obtain other drawings according to these drawings without paying any creative work.

The foregoing and/or additional aspects and advantages of the present disclosure will become obvious and readily understood from the following description of the embodiments in conjunction with the accompanying drawings.

DETAILED DESCRIPTION

The embodiments of the present disclosure are described in detail below. Examples of the embodiments are shown in the accompanying drawings, where identical or similar reference numerals throughout the present disclosure represent identical or similar elements or elements with identical or similar functions. The embodiments described below with reference to the accompanying drawings are exemplary, and are intended to interpret the present disclosure, but shall not be construed as limiting the present disclosure.

A method and occupation control apparatus for a camera application according to the embodiments of the present disclosure are described below with reference to the accompanying drawings. In the art related, when an application that relies on a camera application to provide functional services occupies the camera application, when a home button is triggered to exit for being mounted in the background, or a power button is directly triggered to turn off the screen on an application interface of the occupied camera, there may be two cases, namely, a case that the camera application is not closed and has been requesting data from the camera device in the background, and the other case that the camera data is not requested but the camera device is not closed, thereby resulting in an increase in power consumption of the terminal device and a reduction in battery life of the terminal device. In the occupation control method for a camera application according to the present disclosure, according to a specific situation when the camera application is occupied, unnecessary occupancy is accurately filtered out and optimized, thereby reducing the power consumption of the terminal device and improving the battery life of the terminal device.

A first aspect of the present disclosure provides an occupation control method for a camera application, comprising: detecting whether a first application sends a camera data request message in response to that the camera application is occupied by the first application running in the foreground and determining that a terminal device is in a preset first operating state; sending a delay shutdown message of delaying a first duration to the camera application in response to detecting that the first application sends the camera data request message, and detecting whether a state of the terminal device is switched from the first operating state to a second operating state within the first duration; detecting whether the first application turns on functions related to the camera data request in response to the state of the terminal device not switched to the second operating state and detecting that the first application continues to send the camera data request message, and controlling the first application to release occupancy of the camera application in response to the functions not turned on.

In some embodiments, the determining that a terminal device is in a preset first operating state comprises: determining that the first application is switched from the foreground to the background for running in response to that the terminal device is in a screen-on state; and wherein the detecting whether a state of the terminal device is switched from the first operating state to a second operating state within the first duration comprises: detecting whether the first application is switched from the background to the foreground for running within the first duration.

In some embodiments, the determining that a terminal device is in a preset first operating state comprises: determining that the terminal device is in a screen-off state; and wherein the detecting whether a state of the terminal device is switched from the first operating state to a second operating state within the first duration comprises: detecting whether the terminal device is switched from the screen-off state to a screen-on state within the first preset duration.

In some embodiments, the detecting whether the first application sends a camera data request message comprises: determining acquire first occupancy time and a first application identifier of a camera data request query instruction, in response to acquiring the camera data request query instruction sent by the first application; acquiring application identifier information and corresponding occupancy time that have been recorded in a data request interface, and acquiring second occupancy time that matches the first application identifier the latest time; and detecting whether a time difference between the first occupancy time and the second occupancy time is within a second preset time range.

In some embodiments, prior to releasing occupancy of the camera application by controlling the first application, the method further comprises: determining that the first application does not belong to preset whitelist applications.

In some embodiments, prior to releasing occupancy of the camera application by controlling the first application, the method further comprises: sending a prompt message of releasing occupancy of the camera application in a preset notification manner to a user; and receiving a confirmation instruction for the prompt message.

In some embodiments, subsequent to the detecting whether the first application sends a camera data request message, the method further comprises: sending a delay shutdown message of delaying a second duration to the camera application, in response to detecting the first application not sending the camera data request message; detecting whether there is a second application in the terminal device to open the camera application within the second duration, and closing the camera application in response to that there is no second application.

In some embodiments, subsequent to the detecting whether the state of the terminal device is switched from the first operating state to the second operating state within the first duration, the method further comprises: removing the delay shutdown message of the first duration in response to that the state of the terminal device is switched to the second operating state, controlling the camera application to continue to provide functional services for the first application.

In some embodiments, subsequent to releasing occupancy of the camera application by controlling the first application, the method further comprises: sending a prompt message of optimized power consumption in a preset notification manner to the user.

A second aspect of the present disclosure provides a terminal device, comprising: a memory, a processor, and a computer program stored on the memory and operable on the processor, wherein the computer program, in response to being executed by the processor, implements operations of: detecting whether a first application sends a camera data request message in response to that the camera application is occupied by the first application running in the foreground and determining that a terminal device is in a preset first operating state; sending a delay shutdown message of delaying a first duration to the camera application in response to detecting that the first application sends the camera data request message, and detecting whether a state of the terminal device is switched from the first operating state to a second operating state within the first duration; detecting whether the first application turns on functions related to the camera data request in response to the state of the terminal device not switched to the second operating state and detecting that the first application continues to send the camera data request message, and controlling the first application to release occupancy of the camera application in response to the functions not turned on.

In some embodiments, the determining that a terminal device is in a preset first operating state comprises: determining that the first application is switched from the foreground to the background for running in response to that the terminal device is in a screen-on state; and wherein the detecting whether a state of the terminal device is switched from the first operating state to a second operating state within the first duration comprises: detecting whether the first application is switched from the background to the foreground for running within the first duration.

In some embodiments, the determining that a terminal device is in a preset first operating state comprises: determining that the terminal device is in a screen-off state; and wherein the detecting whether a state of the terminal device is switched from the first operating state to a second operating state within the first duration comprises: detecting whether the terminal device is switched from the screen-off state to a screen-on state within the first preset duration.

In some embodiments, the detecting whether the first application sends a camera data request message comprises: determining first occupancy time of acquiring a camera data request query instruction and a first application identifier, in response to acquiring the camera data request query instruction sent by the first application; acquiring application identifier information and corresponding occupancy time that have been recorded in a data request interface, and acquiring second occupancy time that matches the first application identifier the latest time; and detecting whether a time difference between the first occupancy time and the second occupancy time is within a second preset time range.

In some embodiments, prior to releasing occupancy of the camera application by controlling the first application, the operations further comprise: determining that the first application does not belong to preset whitelist applications.

In some embodiments, prior to releasing occupancy of the camera application by controlling the first application, the operations further comprise: sending a prompt message of releasing occupancy of the camera application in a preset notification manner to a user; and receiving a confirmation instruction for the prompt message.

In some embodiments, subsequent to the detecting whether the first application sends a camera data request message, the operations further comprise: sending a delay shutdown message of delaying a second duration to the camera application, in response to detecting the first application not sending the camera data request message; detecting whether there is a second application in the terminal device to open the camera application within the second duration, and closing the camera application in response to that there is no second application.

In some embodiments, subsequent to the detecting whether the state of the terminal device is switched from the first operating state to the second operating state within the first duration, the operations further comprise: removing the delay shutdown message of the first duration in response to that the state of the terminal device is switched to the second operating state, controlling the camera application to continue to provide functional services for the first application.

In some embodiments, subsequent to releasing occupancy of the camera application by controlling the first application, the operations further comprise: sending a prompt message of optimized power consumption in a preset notification manner to the user.

In some embodiments, the prompt message comprises at least one of a pop-up notification, short message notification, and voice notification.

A third aspect of the present disclosure provides a non-transitory computer-readable storage medium, having stored on a computer program which, in response to being executed by the processor, implements the operations of: detecting whether a first application sends a camera data request message in response to that the camera application is occupied by the first application running in the foreground and determining that a terminal device is in a preset first operating state; sending a delay shutdown message of delaying a first duration to the camera application in response to detecting that the first application sends the camera data request message, and detecting whether a state of the terminal device is switched from the first operating state to a second operating state within the first duration; detecting whether the first application turns on functions related to the camera data request in response to the state of the terminal device not switched to the second operating state and detecting that the first application continues to send the camera data request message, and controlling the first application to release occupancy of the camera application in response to the functions not turned on.

Figure 1:
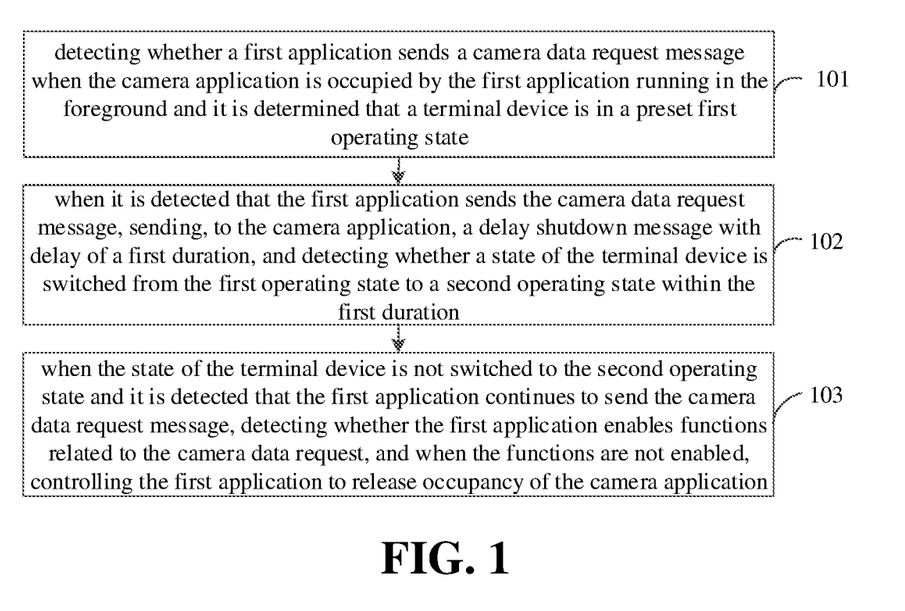
FIG. 1 is a schematic flowchart of an occupation control method for a camera application according to an embodiment of the present disclosure.

FIG. 1 is a schematic flowchart of an occupation control method for a camera application according to an embodiment of the present disclosure. As shown in FIG. 1, the method includes the following operations.

In Operation 101, when the camera application is occupied by a first application running in the foreground, when it is determined that a terminal device is in a preset first operating state, it is detected whether the first application sends a camera data request message.

Specifically, when the camera application is occupied by the first application running in the foreground of the current terminal device, it is determined whether the terminal device is in a preset first operating state to judge a specific use situation when the current first application occupies the camera application. Therein, the preset first operating state corresponds to an operating state in which the first application occupying the camera application may involve unnecessary occupancy. In order to detect whether the current first application is using the camera application for functional services in the first operating state, it is detected whether the first application sends a camera data request message.

It is easily understood that, when the first application sends a camera data request, it means that the current first application is requesting camera data and is not idle for a corresponding process after calling up the camera application. At this time, it is needed to further judge whether to provide functional services after the first application requests the camera data.

It should be noted that, according to different application scenarios, manners of detecting whether the first application sends the camera data request message are different. Examples are as follows.

Figure 2:
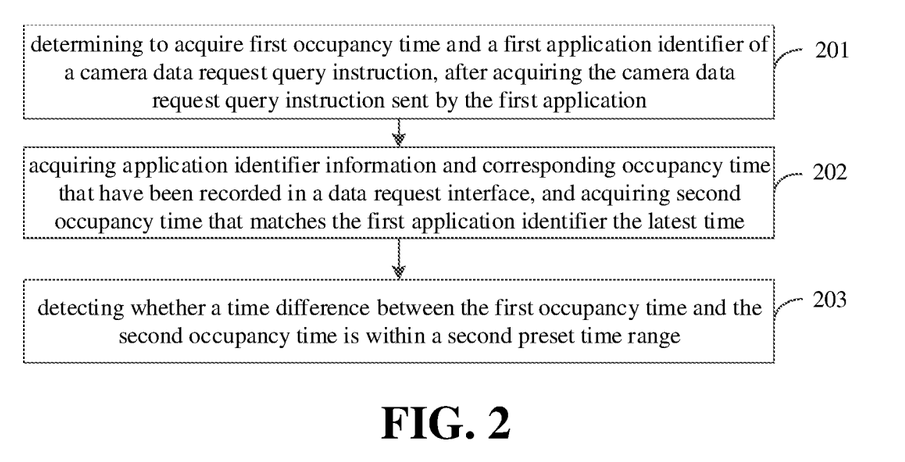
FIG. 2 is a schematic flowchart of another occupation control method for a camera application according to an embodiment of the present disclosure.

As a possible implementation manner, as shown in FIG. 2, different operations of a manner of detecting whether the first application sends the camera data request message include the following.

In Operation 201, after acquiring a camera data request query instruction sent by the first application, a determination is made to acquire first occupancy time and a first application identifier for the camera data request query instruction.

The first occupancy time may be acquired by querying the current system time.

In Operation 202, application identifier information and corresponding occupancy time that have been recorded in a data request interface may be acquired, and second occupancy time that matches the first application identifier the latest time may be acquired.

It should be understood that, in an actual execution process, when the camera application is called up, an interface for the camera data request will be executed, and the application identifier and request time of the camera data request will be recorded in the interface. Therein, the application identifier includes identifier information capable of uniquely identifying the application program, such as a process ID for calling up the camera application by the application, an application package name, or the like.

In the embodiment of the present disclosure, when the first application sends a camera data request message to the camera application, the first occupancy time when the first application occupies the camera application and the first application identifier are recorded in the data request interface corresponding to the camera application, so as to further detect whether the first application will call up the camera application to be idle for the corresponding process according to the record.

Specifically, after acquiring the camera data request query instruction, the application identifier information and the corresponding occupancy time recorded in the data request interface are acquired, and the second occupancy time matching the first application identifier a time nearest to a current moment of acquiring the camera data request query instruction in the application identifier information and the corresponding occupancy time recorded before the camera data request query instruction is acquired. That is, time recorded last time when the first application sends the camera data request message before acquiring the camera data request query instruction is acquired.

In Operation 203, it is detected whether a time difference between the first occupancy time and the second occupancy time is within a second preset time range.

The second preset time range is calibrated according to a large amount of experimental data, and may be 500 ms or the like.

It should be understood that, when the first application calls up the camera application to be idle for the corresponding process, the first occupancy time of currently sending the camera data request query instruction has a greater time difference than the second occupancy time of sending the camera data request query instruction at a moment closest to the current moment; and when the first application calls up the camera application not to be idle for the corresponding process, the first occupancy time of currently sending the camera data request query instruction has a smaller time difference than the second occupancy time of sending the camera data request query instruction at a moment closest to the current moment.

In the embodiment of the present disclosure, by detecting whether the time difference between the first occupancy time and the second occupancy time is within the second preset time range, it is determined whether the first application sends the camera data request. That is, when the time difference between the first occupancy time and the second occupancy time is within the second preset time range, it is determined that the first application sends the camera data request message. Otherwise, even when the first application sends the camera data request message, but there is a longer interval with respect to the time when the camera data request message was sent last time, it is considered that the camera data request message is not received.

In Operation 102, when it is detected that the first application sends the camera data request message, a delay shutdown message with delay of a first duration is sent to the camera application, and it is detected whether a state of the terminal device is switched from the first operating state to the second operating state within the first duration.

The first duration is calibrated according to a large amount of experimental data, and can be 1 minute, or the like.

Specifically, when it is detected that the first application sends the camera data request message, it is shown that the first application is not idle for the corresponding process after calling up the camera application. At this time, a delay shutdown message with delay of a first duration is sent to the camera application. Within the first duration, the camera application will not be closed. It should be understood that, within the first duration, it is possible to further judge whether the current first application is using the camera application for functional services. It is needed to detect whether the state of the terminal device is switched from the first operating state to the second operating state within the first duration. It may be understood that, in the second operating state, occupancy of the camera application by the first application is necessary occupancy, which does not belong to the case that power consumption of the terminal device can be optimized.

It should be emphasized that, in order to ensure that the power consumption of the terminal device can be optimized, the above-mentioned first duration should be less than a default shutdown duration of the camera application set by the terminal device system. Therein, the default shutdown duration corresponds to a duration when the camera application is directly shut down when the camera data is not requested therefrom within the default shutdown duration.

In Operation 103, when the state of the terminal device is not switched to the second operating state and it is detected that the first application continues to send the camera data request message, it is detected whether the first application has enabled functions related to the camera data request. If not, the first application is controlled to release the occupancy of the camera application.

The functions related to the camera data request include video chat, audio playing during live broadcast operations, audio recording, and floating player functions. The camera data needs to be used at the time of performing video chat and live broadcast operation.

Specifically, when the first application is not switched to the second operating state within the first duration and it is detected that the first application still continues to send the camera data request message, it is detected whether the first application enables the functions related to the camera data request message, to judge whether the camera application data for which the current first application requests the camera application is used for functional services. When the functions are not enabled, the first application is controlled to release the occupancy of the camera application, so as to optimize the power consumption of the terminal device.

Of course, in consideration of individual needs of users, some first applications may be required to always occupy the camera applications. In this case, whitelist applications can also be set. Applications in the whitelist applications do not participate in optimization processing of the embodiments of the present disclosure. That is, before controlling the first applications to release the occupancy of the camera applications, it is also necessary to determine that the first application do not belong to the preset whitelist applications.

In an embodiment of the present disclosure, when it is detected that the first application is switched to the second operating state, it is shown that the current first application requests the camera data for functional services. At this time, the delay shutdown message of the first duration sent before is removed, and the camera application is controlled to normally provide functional services for the first application.

In an embodiment of the present disclosure, when it is detected that the first application does not send the camera data request message, it is shown that the first application is idle for the corresponding process after calling up the camera application. At this time, it is further needed to judge whether other application calls the camera application. That is, a delay shutdown message with delay of a second duration is sent to the camera application. According to studies on a large amount of experimental data, the second duration is greater than the first duration. For example, the first duration is one minute and the second duration is two minutes. As such, more redundant time is provided for other application to call up the camera application, thereby avoiding power losses caused by repeated opening and closing of the camera application. Within the second duration, the camera application is not closed. During the second duration, it is detected whether the terminal device has a second application to open the camera application. If not, the camera application is closed. If yes, the delay shutdown message of the second duration sent before is removed, and the camera application normally provides functional services for the second application.

In actual implementation, in order to satisfy individual needs of the users, in the above-mentioned embodiment, user prompts for related operations can be performed. Therein, when prompts for certain operations are performed, the users' active confirmation operations can be acquired.

In an embodiment of the present disclosure, prior to controlling the first application to release the occupancy of the camera application, a prompt message of camera application occupancy release is further sent to the user in a preset notification manner, for example, SMS notification, pop-up notification, or the like. Therein, only after controls in the prompt message for providing and receiving the user's confirmation operation receive the user's confirmation operation for the prompt message, the camera application is released.

In an embodiment of the present disclosure, after the occupancy of the camera application by the first application is released, the user can also be prompted with a pop-up notification, short message notification, voice notification, etc., that the power consumption has been optimized. For example, the user is prompted that the first application has released the occupancy of the camera application.

Based on the above description, it can be learned that, the first operating state and the second operating state respectively correspond to an operating state in which the first application occupying the camera application may involve unnecessary occupancy, i.e., a state falling into a power consumption optimization range, and an operating state that the first application occupying the camera application may substantially not involve unnecessary occupancy, i.e., a state not falling into the power consumption optimization range. In order to be more clear to those skilled in the art, the following is a description of methods for controlling occupancy of a camera application in conjunction with the above two operating states at different application scenes, respectively.

In the following application scenarios, the first duration is one minute, and the second duration is two minutes.

Scene One

Figure 3A:
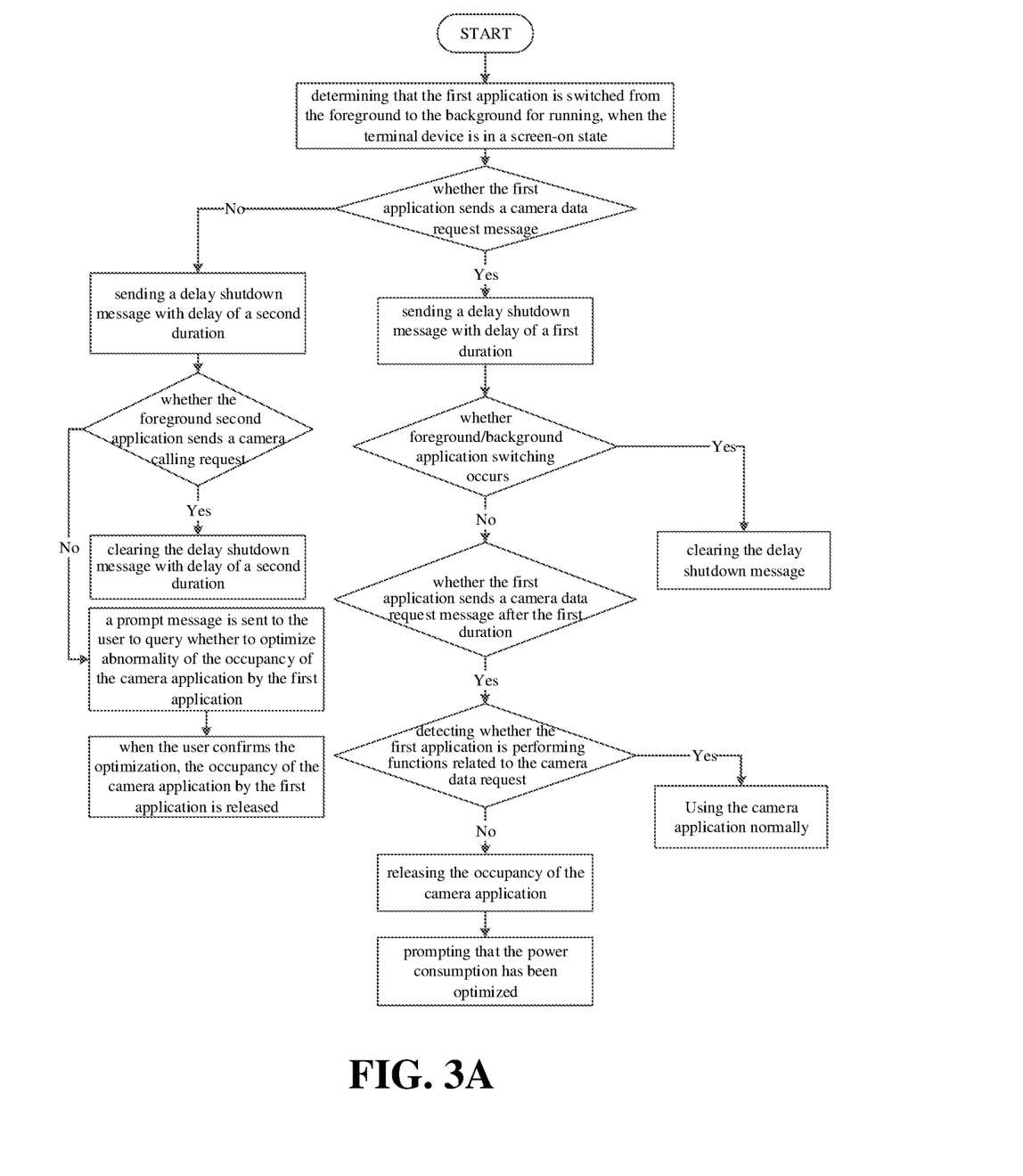
FIG. 3A is a schematic flowchart of another occupation control method for a camera application according to an embodiment of the present disclosure.

In this scene, the first operating state of the terminal device is an operating state in which the first application is switched from the foreground to the background in a screen-on state, and the second operating state corresponds to an operating state in which the first application is switched from the background to the foreground in the screen-on state.

Specifically, as shown in FIG. 3A, when the screen of the terminal device is on, when it is detected that the first application occupying the camera application is switched from the foreground to the background for running, it is detected whether the first application sends a camera data request in order to determine whether the first application is idle for the process occupying the camera application.

When the first application sends the camera data request, a delay shutdown message of one minute is sent to control the camera application not to close within one minute, and it is detected whether the state of the terminal device is switched from the background to the foreground for running within one minute. When the state of the terminal device is switched to the foreground for running, it is considered that the first application is using the camera application to provide functional services, thereby clearing the sent delay shutdown message and controlling the camera application to normally provide functional services.

When the state of the terminal device is not switched to the foreground for running, it is further judged whether requesting, by the first application, camera data is to implement functional services, and it is detected whether the first application continues to send the camera data request message after one minute. When the first application continues to send the camera data request message, it is detected whether the first application is performing functions related to the camera data request, such as live broadcast or video chat. If yes, the camera application is not closed. If not, the first application is controlled to release the occupancy of the camera application; the first application is forcibly stopped from using the camera application; and the user is prompted that the power consumption of the terminal device has been optimized, by clearing unnecessary occupancy of the camera application by the first application.

In this embodiment, when the first application does not send the camera data request, a delay shutdown message of two minutes is sent to detect whether the second application currently running in the foreground has a behavior of opening the camera application within two minutes. If yes, the delay shutdown message of two minutes sent previously is removed, and the camera application is controlled to normally provide functional services for the second application. At this time, the occupancy of the camera application by the first application is covered or released. When the second application does not have the behavior of opening the camera application within two minutes, a prompt message is sent to the user to query whether to optimize abnormality of the occupancy of the camera application by the first application. When the user confirms the optimization, the occupancy of the camera application by the first application is released.

Scene Two

Figure 3B:
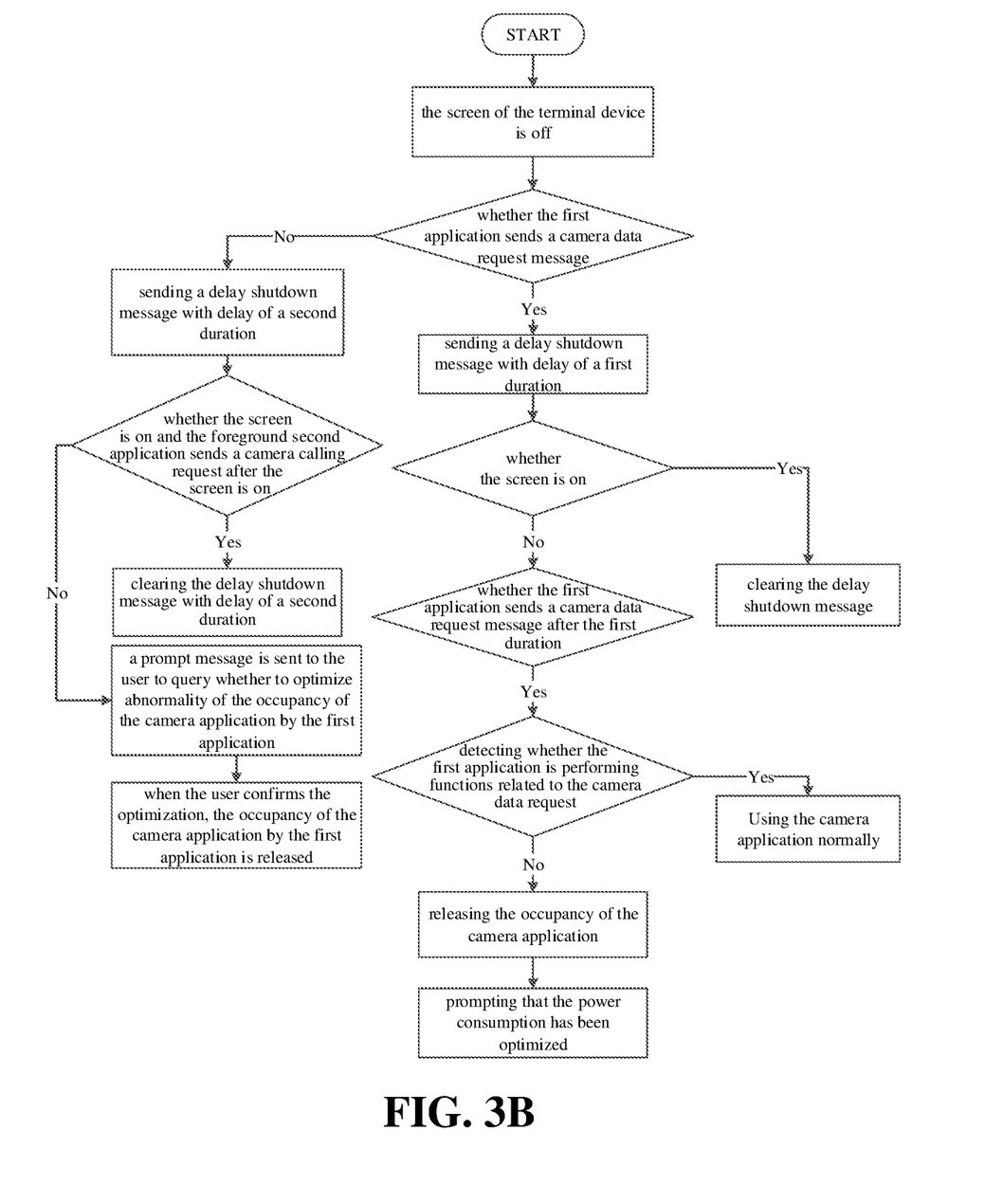
FIG. 3B is a schematic flowchart of another occupation control method for a camera application according to an embodiment of the present disclosure.

In this scene, the first operating state of the terminal device corresponds to a screen-off state, and the second operating state corresponds to switching, by the terminal device, from the screen-off state to a screen-on state.

As shown in FIG. 3B, when the first application occupies the camera application, it is determined whether the screen of the terminal device is off. If yes, it is detected whether the first application sends a camera data request message, to determine whether a process that the first application occupies the camera application is idle. When the first application sends the camera data request, it is shown that the process that the first application occupies the camera application is not idle. In this case, in order to further judge whether the first application is using the camera application to provide functional services, a delay shutdown message with delay of a first duration is sent to the camera application, and it is detected whether the state of the terminal device is switched from the screen-off state to the screen-on state within one minute. When the state of the terminal device is switched from the screen-off state to the screen-on state, it is considered that the first application is using the camera application to provide functional services, thereby clearing the delay message of one minute sent before and controlling the camera application to normally provide functional services.

When the state of the terminal device is not switched from the screen-off state to the screen-on state within one minute, it is further judged whether the first application is using the camera application to provide functional services. When it is detected that the first application continues to send the camera data request message after one minute, it is detected whether the first application is performing functions related to the camera data request, such as live broadcast or video chat. If yes, the camera application is not closed, and if not, the first application is controlled to release the occupancy of the camera application, and is forcibly stopped from using the camera application; and the user is prompted that the power consumption of the terminal device has been optimized, by clearing the unnecessary occupancy of the camera application by the first application.

In this embodiment, when the first application does not send the camera data request, a delay shutdown message of two minutes is sent to detect whether the screen of the terminal device is on within two minutes and whether the second application running in the foreground after the screen is on has a behavior of opening the camera application. If yes, the delay shutdown message of two minutes sent before is cleared, and the camera application is controlled to normally provide functional services for the second application. In this case, the occupancy of the camera application by the first application is covered or released. When the second application does not have the behavior of opening the camera application within two minutes, a prompt message is sent to the user to query whether to optimize abnormality of occupancy of the camera application by the first application. When the user confirms the optimization, the occupancy of the camera application by the first application is released.

In sum, in the occupation control method for a camera application in the embodiments of the present disclosure, when the camera application is occupied by a first application running in the foreground, when it is determined that the terminal device is in a preset first operating state, it is detected whether the first application sends a camera data request message. When it is detected that the first application sends the camera data request message, a delay shutdown message with delay of a first duration is sent to the camera application, and it is detected whether a state of the terminal device is switched from the first operating state to the first operating state within the first duration. Thus, when the state of the terminal device is not switched to the second operating state and it is detected that the first application continues to send the camera data request message, it is detected whether the first application enables functions related to the camera data request. If not, the first application is controlled to release occupancy of the camera application. Therefore, unnecessary occupancy is optimized according to usage of the camera application when the application occupies the camera application, which reduces power consumption of the terminal device and improves battery life of the terminal device.

Figure 4:
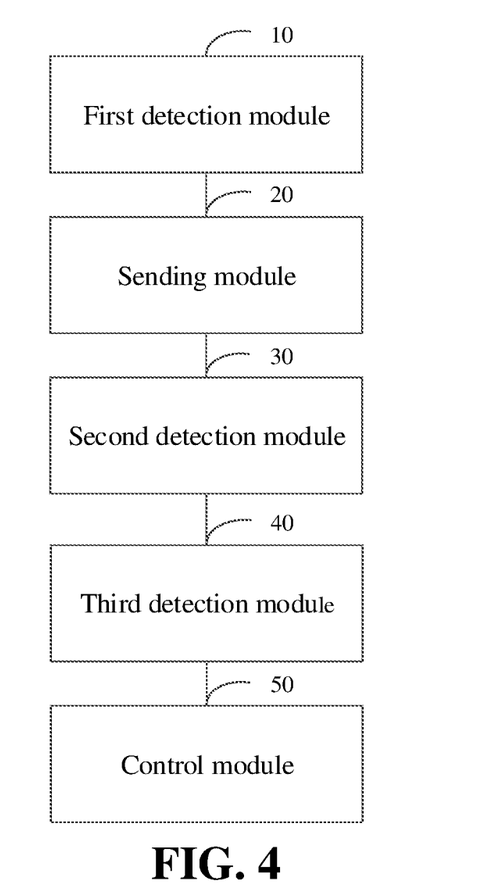
FIG. 4 is a structural schematic diagram of an occupation control apparatus for a camera application according to an embodiment of the present disclosure.

In order to implement the above embodiments, the present disclosure further provides an occupation control apparatus for a camera application. FIG. 4 is a structural schematic diagram of an occupation control apparatus for a camera application according to an embodiment of the present disclosure. As shown in FIG. 4, the apparatus includes a first detection module 10, a sending module 20, a second detection module 30, a third detection module 40 and a control module 50.

The first detection module 10 is configured to detect whether the first application sends a camera data request message when it is determined that the terminal device is in a preset first operating state, when the camera application is occupied by the first application running in the foreground.

The sending module 20 is configured to send a delay shutdown message with delay of a first duration to the camera application when it is detected that the first application sends the camera data request message.

The second detection module 30 is configured to detect whether a state of the terminal device is switched from the first operating state to a second operating state within the first duration.

The third detection module 40 is configured to detect whether the first application enables functions related to the camera data request when the state of the terminal device is not switched to the second operating state and it is detected that the first application continues to send the camera data request message.

The control module 50 is configured to control the first application to release its occupancy of the camera application when the functions are not enabled.

In an embodiment of the present disclosure, determining that the terminal device is in a preset first operating state comprises: determining that the first application is switched from running in the foreground to running in the background, when the terminal device is in a screen-on state. The second detection module 30 is specifically configured to detect whether the first application is switched from the background to the foreground for running within the first duration.

In an embodiment of the present disclosure, determining that the terminal device is in a preset first operating state comprises: determining that the terminal device is in a screen-off state. The second detection module 30 is specifically configured to detect whether the terminal device is switched from the screen-off state to a screen-on state within the first preset time.

In an embodiment of the present disclosure, the first detection module 10 is specifically configured to: determine to acquire first occupancy time and a first application identifier of a camera data request query instruction, after acquiring the camera data request query instruction sent by the first application; acquire application identifier information and corresponding occupancy time that have been recorded in a data request interface, and acquire second occupancy time that matches the first application identifier the latest time; and detect whether a time difference between the first occupancy time and the second occupancy time is within a second preset time range.

In an embodiment of the present disclosure, the apparatus further includes a determination module, configured to determine that the first application does not belong to preset whitelist applications.

In an embodiment of the present disclosure, the apparatus further includes a release prompt module, configured to send a prompt message of camera application occupancy release to the user in a preset notification manner, and to receive a confirmation operation for the prompt message.

In an embodiment of the present disclosure, the apparatus further includes a processing module, configured to send, to the camera application, a delay shutdown message with delay of a second duration when it is detected that the first application does not send the camera data request message, and to detect whether there is a second application in the terminal device to open the camera application within the second duration, and to close the camera application, when there is no second application in the terminal device.

In an embodiment of the present disclosure, the apparatus further includes a removing module, configured to remove the delay shutdown message with delay of a first duration sent before when it is switched to the second operating state, and to control the camera application to normally provide functional services for the first application.

In an embodiment of the present disclosure, the apparatus further includes an optimization prompt module, configured to prompt the user with prompt information that power consumption has been optimized in the preset notification manner.

It should be noted that the foregoing explanation of the embodiment of the occupation control method for a camera application is also applicable to the occupation control apparatus for a camera application in this embodiment, which is not be detailed herein.

In sum, in the occupation control apparatus for a camera application according to the embodiment of the present disclosure, when the camera application is occupied by a first application running in the foreground, when it is determined that the terminal device is in a preset first operating state, it is detected whether the first application sends a camera data request message. When it is detected that the first application sends the camera data request message, a delay shutdown message with delay of a first duration is sent to the camera application, and it is detected whether a state of the terminal device is switched from the first operating state to a second operating state within the first duration. Further, when the state of the terminal device is not switched to the second operating state, and it is detected that the first application continues to send the camera data request message, it is detected whether the first application enables functions related to the camera data request, and when the functions are not enabled, the first application is controlled to release its occupancy of the camera application. Therefore, unnecessary occupancy is optimized according to usage of the camera application when the application occupies the camera application, which reduces power consumption of the terminal device and improves battery life of the terminal device.

In order to implement the above-mentioned embodiments, the present disclosure further provides a terminal device, comprising: a memory, a processor, and a computer program stored on the memory and operable on the processor. The computer program, which executed by the processor, implements an occupation control method for a camera application according to any of the foregoing embodiments.

In order to implement the above-mentioned embodiments, the present disclosure further provides a computer-readable storage medium having stored thereon a computer program, which, when executed by a processor, implements a control occupation control method for a camera application according to any of the foregoing embodiments of the present disclosure.

In the description of this specification, descriptions with reference to the terms "an embodiment", "some embodiments", "example(s)", "specific example(s)", or "some examples" etc. mean that specific features, structures, materials, or characteristics described in conjunction with the embodiment(s) or example(s) are included in at least one embodiment or example of the present disclosure. In this specification, illustrative representations of the above-mentioned terms are not necessarily directed to a same embodiment or example. Moreover, the described specific features, structures, materials or characteristics can be combined in any one or more embodiments or examples in an appropriate manner. In addition, those skilled in the art can combine different embodiments or examples, and features of different embodiments or examples described in this specification, without mutual contradiction.

Further, the terms "first" and "second" are used only for descriptive purposes, and shall not be construed as indicating or implying relative importance or implicitly indicating the number of indicated technical features. Therefore, the features defined with "first" and "second" may explicitly or implicitly include at least one of the features. In the description of the present disclosure, "a plurality of" means at least two, such as two, three, etc., unless otherwise specifically defined.

Any process or method description in the flowcharts or described in other ways herein may be understood as representing a module, segment, or portion of code, which comprises one or more executable instructions for implementing the specified logical function(s) or operations of the process. Moreover, the scope of preferred embodiments of the present disclosure includes additional implementation, which may comprise performing functions in no accordance with the order shown or discussed, for example, in a substantially simultaneous manner or in reverse order according to the functions involved, which should be understood by those skilled in the art to which the embodiments of the present disclosure pertain.

The logic and/or operations represented in the flowcharts or described in other ways herein, for example, may be considered as a sequenced list of executable instructions for implementing logic functions, and can be specifically embodied in any computer-readable medium, for use by or in connection with the instruction execution system, apparatus or device (such as a computer-based systems, a systems including a processor, or other system that can fetch and execute instructions from the instruction execution system, apparatus, or device). As far as this specification is concerned, a "computer-readable medium" can be any means that contain, store, communicate, propagate or transport the program for use by or in connection with the instruction execution system, apparatus or device. More specific examples (a non-exhaustive list) of the computer-readable medium include the following: an electrical connection (an electronic device) with one or more wirings, a portable computer disk cartridge (a magnetic device), a random access memory (RAM), a read-only memory (ROM), an erasable and programmable read-only memory (EPROM or flash memory), an optical fiber device, and a portable compact disk read-only memory (CDROM). In addition, the computer-readable medium may even be paper on which the program can be printed, or other suitable medium, because it is possible, for example, to perform optical scanning of the paper or other medium, and then to perform editing, interpreting, or perform treatment in other appropriate manner if necessary, to obtain the program which is subsequently stored in the computer memory.

It should be understood that, each part of the present disclosure can be implemented by hardware, software, firmware or a combination thereof. In the foregoing embodiments, multiple operations or methods can be implemented by software or firmware stored in the memory and executed by a suitable instruction execution system. For example, when it is implemented by hardware as in another embodiment, it can be implemented by any one or a combination of the following technologies known in the art: a discrete logic circuit having a logic gate circuit for implementing logic functions on data signals, an application specific integrated circuit with a suitable combinational logic gate circuit, a programmable gate array (PGA), a field programmable gate array (FPGA), etc.

Those of ordinary skill in the art may understand that, all or part of the operations carried in the foregoing embodiment method can be accomplished by relevant hardware instructed by a program, where the program can be stored in a computer-readable storage medium, and when executed, includes one or a combination of the operations of the method embodiments.

Furthermore, the respective functional units in various embodiments of the present disclosure may be integrated into a processing module, or each unit may exist alone physically, or two or more units may be integrated into a module. The above-mentioned integrated module can be implemented in the form of hardware or a software functional module. When the integrated module is implemented in the form of a software function module and sold or used as an independent product, it may also be stored in a computer-readable storage medium.

The storage medium mentioned above may be a read-only memory, a magnetic disk, an optical disk, or the like. Although the embodiments of the present disclosure have been shown and described above, it may be understood that the above-mentioned embodiments are exemplary and shall not be construed as limiting the present disclosure. A person of ordinary skill in the art may make variations, modifications, replacements and transformations of the foregoing embodiments within the scope of the present disclosure.

What is claimed is:

1. A method of occupation control for a camera application, comprising:
when a camera application is occupied by a first application running in a foreground and it is determined that a terminal device is in a preset first operating state, detecting whether the first application sends a camera data request message;
in response to detecting that the first application sends the camera data request message, sending a delay shutdown message for delaying a first duration to the camera application, and detecting whether a state of the terminal device is switched from the preset first operating state to a second operating state within the first duration;
when the state of the terminal device is not switched to the second operating state and it is detected that the first application continues to send the camera data request message, detecting whether camera data requested by the camera data request message is used for a preset functional service; and
when it is detected that the camera data requested by the camera data request message is not used for the preset functional service, controlling the first application to release occupancy of the camera application.

2. The method according to claim 1, wherein the terminal device is determined as being in the preset first operating state by:
determining that the first application is switched from the foreground to a background for running in response to that the terminal device is in a screen-on state; and
wherein detecting whether the state of the terminal device is switched from the preset first operating state to the second operating state within the first duration comprises:
detecting whether the first application is switched from the background to the foreground for running within the first duration.

3. The method according to claim 1, wherein the terminal device is determined as being in the preset first operating state by:
determining that the terminal device is in a screen-off state; and
wherein detecting whether the state of the terminal device is switched from the preset first operating state to the second operating state within the first duration comprises:
detecting whether the terminal device is switched from the screen-off state to a screen-on state within the first duration.

4. The method according to claim 1, wherein detecting whether the first application sends the camera data request message comprises:
determining first occupancy time of acquiring a camera data request query instruction and a first application identifier, in response to acquiring the camera data request query instruction sent by the first application;
acquiring application identifier information and corresponding occupancy time that have been recorded in a data request interface, and acquiring second occupancy time that matches the first application identifier a latest time; and
detecting whether a time difference between the first occupancy time and the second occupancy time is within a second preset time range.

5. The method according to claim 1, wherein prior to releasing occupancy of the camera application by controlling the first application, the method further comprises:
determining that the first application does not belong to preset whitelist applications.

6. The method according to claim 1, wherein prior to releasing occupancy of the camera application by controlling the first application, the method further comprises:
sending a prompt message of releasing occupancy of the camera application in a preset notification manner to a user; and
receiving a confirmation instruction for the prompt message.

7. The method according to claim 1, wherein subsequent to the detecting whether the first application sends a camera data request message, the method further comprises:
sending a delay shutdown message of delaying a second duration to the camera application, in response to detecting the first application not sending the camera data request message;
detecting whether there is a second application in the terminal device to open the camera application within the second duration; and
closing the camera application in response to that there is no second application.

8. The method according to claim 1, wherein subsequent to the detecting whether the state of the terminal device is switched from the preset first operating state to the second operating state within the first duration, the method further comprises:
removing the delay shutdown message of the first duration in response to that the state of the terminal device is switched to the second operating state,
controlling the camera application to continue to provide functional services for the first application.

9. The method according to claim 1, wherein subsequent to releasing occupancy of the camera application by controlling the first application, the method further comprises:
sending a prompt message of optimized power consumption in a preset notification manner to a user.

10. A terminal device, comprising: a memory, a processor, and a computer program stored on the memory and operable on the processor, wherein the computer program, in response to being executed by the processor, implements operations of:
when a camera application is occupied by a first application running in a foreground and it is determined that a terminal device is in a preset first operating state, detecting whether a first application sends a camera data request message;
in response to detecting that the first application sends the camera data request message, sending a delay shutdown message for delaying a first duration to the camera application and detecting whether a state of the terminal device is switched from the preset first operating state to a second operating state within the first duration;
when the state of the terminal device is not switched to the second operating state and it is detected that the first application continues to send the camera data request message, detecting whether camera data requested by the camera data request message is used for a preset functional service; and when it is detected that the camera data requested by the camera data request message is not used for the preset functional service, controlling the first application to release occupancy of the camera application.

11. The terminal device according to claim 10, wherein the terminal device is determined as being in the preset first operating state by:
determining that the first application is switched from the foreground to a background for running in response to that the terminal device is in a screen-on state; and
wherein detecting whether the state of the terminal device is switched from the preset first operating state to the second operating state within the first duration comprises:
detecting whether the first application is switched from the background to the foreground for running within the first duration.

12. The terminal device according to claim 10, wherein the terminal device is determined as being in the preset first operating state by:
determining that the terminal device is in a screen-off state; and
wherein detecting whether the state of the terminal device is switched from the preset first operating state to the second operating state within the first duration comprises:
detecting whether the terminal device is switched from the screen-off state to a screen-on state within the first duration.

13. The terminal device according to claim 10, wherein detecting whether the first application sends the camera data request message comprises:
determining first occupancy time of acquiring a camera data request query instruction and a first application identifier, in response to acquiring the camera data request query instruction sent by the first application;
acquiring application identifier information and corresponding occupancy time that have been recorded in a data request interface, and acquiring second occupancy time that matches the first application identifier a latest time; and
detecting whether a time difference between the first occupancy time and the second occupancy time is within a second preset time range.

14. The terminal device according to claim 10, wherein prior to releasing occupancy of the camera application by controlling the first application, the operations further comprise:
determining that the first application does not belong to preset whitelist applications.

15. The terminal device according to claim 10, wherein prior to releasing occupancy of the camera application by controlling the first application, the operations further comprise:
sending a prompt message of releasing occupancy of the camera application in a preset notification manner to a user; and
receiving a confirmation instruction for the prompt message.

16. The terminal device according to claim 10, wherein subsequent to the detecting whether the first application sends a camera data request message, the operations further comprise:
sending a delay shutdown message of delaying a second duration to the camera application, in response to detecting the first application not sending the camera data request message;
detecting whether there is a second application in the terminal device to open the camera application within the second duration; and
closing the camera application in response to that there is no second application.

17. The terminal device according to claim 10, wherein subsequent to the detecting whether the state of the terminal device is switched from the preset first operating state to the second operating state within the first duration, the operations further comprise:
removing the delay shutdown message of the first duration in response to that the state of the terminal device is switched to the second operating state,
controlling the camera application to continue to provide functional services for the first application.

18. The terminal device according to claim 10, wherein subsequent to releasing occupancy of the camera application by controlling the first application, the operations further comprise:
sending a prompt message of optimized power consumption in a preset notification manner to a user.

19. The terminal device according to claim 18, wherein the prompt message comprises at least one of a pop-up notification, short message notification, or voice notification.

20. A non-transitory computer-readable storage medium, having stored on a computer program which, in response to being executed by a processor, implements operations of:
when a camera application is occupied by a first application running in a foreground and it is determined that a terminal device is in a preset first operating state, detecting whether a first application sends a camera data request message;
in response to detecting that the first application sends the camera data request message, sending a delay shutdown message for delaying a first duration to the camera application and detecting whether a state of the terminal device is switched from the preset first operating state to a second operating state within the first duration;
when the state of the terminal device is not switched to the second operating state and it is detected that the first application continues to send the camera data request message, detecting whether camera data requested by the camera data request message is used for a preset functional service; and
when it is detected that the camera data requested by the camera data request message is not used for the preset functional service, controlling the first application to release occupancy of the camera application.

* * * * *